United States Patent [19]
Ekas

[11] 3,771,618
[45] Nov. 13, 1973

[54] MAINTENANCE VEHICLE
[76] Inventor: Frank Ekas, Sarver, Pa.
[22] Filed: Mar. 22, 1972
[21] Appl. No.: 237,019

[52] U.S. Cl.................. 180/42, 180/52, 280/43.23, 180/66 R
[51] Int. Cl............................................. B60k 17/30
[58] Field of Search .................. 180/11, 12, 13, 14, 180/26, 52, 42, 66 R; 280/43.23; 56/7, 14.8, 16.7, 17.1

[56] References Cited
UNITED STATES PATENTS

| | | | |
|---|---|---|---|
| 652,673 | 6/1900 | Greffe.................................. | 180/52 |
| 2,725,703 | 12/1955 | Roseman, Jr. ............................ | 56/7 |
| 408,229 | 8/1889 | Frazier................................. | 180/52 |
| 3,097,465 | 7/1963 | Williams................................ | 56/7 |
| 3,299,982 | 1/1967 | Bacon.................................. | 180/52 |

FOREIGN PATENTS OR APPLICATIONS

| | | | |
|---|---|---|---|
| 631,960 | 12/1961 | Canada................................ | 180/52 |

*Primary Examiner*—Kenneth H. Betts
*Assistant Examiner*—J. M. McCormack
*Attorney*—George Raynovich, Jr.

[57] ABSTRACT

A rideable, short-turning radius vehicle is provided primarily for golf course green maintenance. The vehicle body is in two parts, the accessory retaining section and the driving and steering section. The body parts are connected in a unique pivoting arrangement that permits the vehicle to make extremely short radius turns. The driving and steering section has mounted thereon a driving engine, driveable wheels, and a seat. The pivoting connection between the two body sections causes the driver and the engine to turn as a unit with the front end of the body. The accessory retaining section of the body may be raised and lowered by power means to vary the height of the accessories above the ground.

8 Claims, 3 Drawing Figures

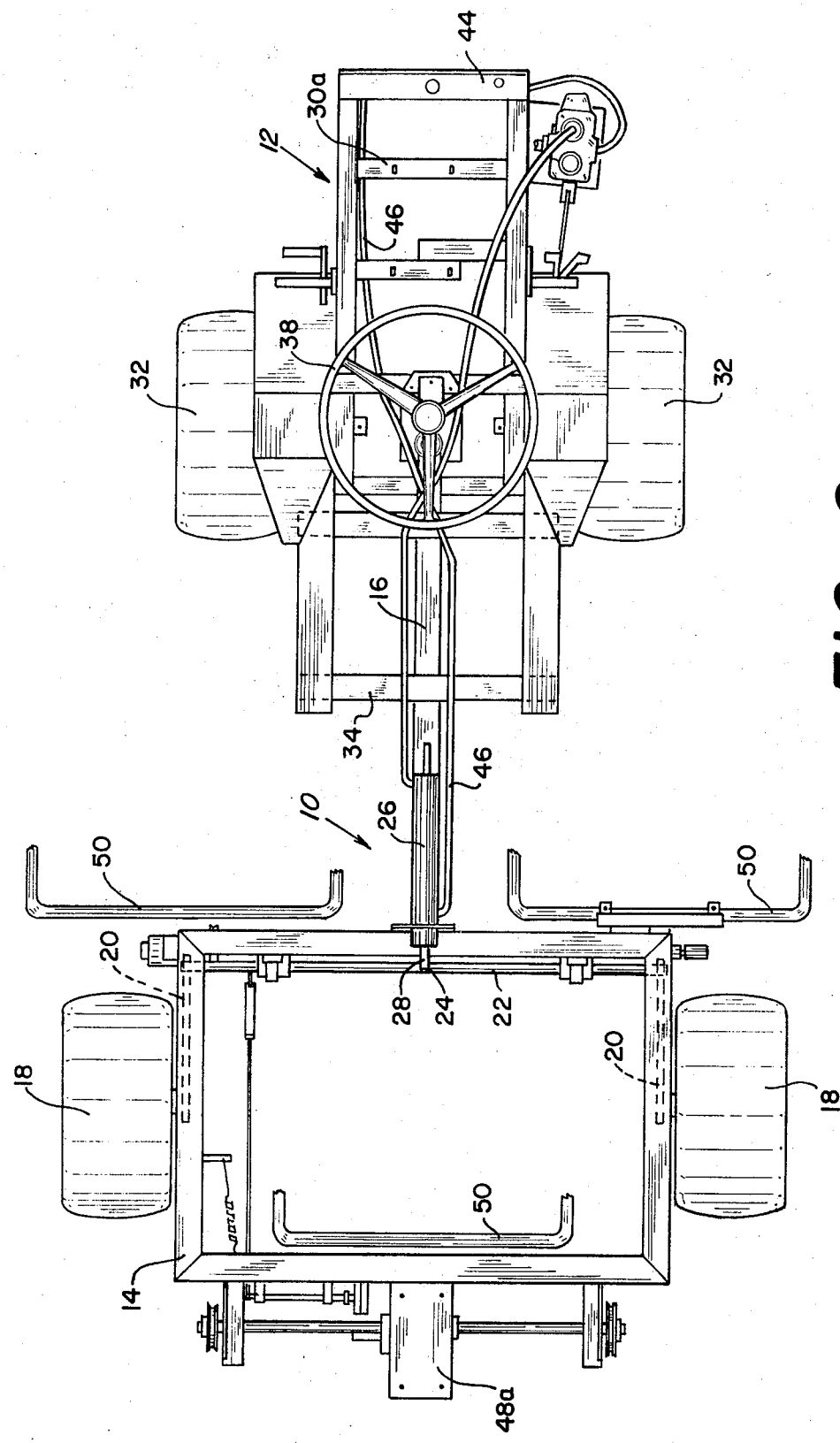

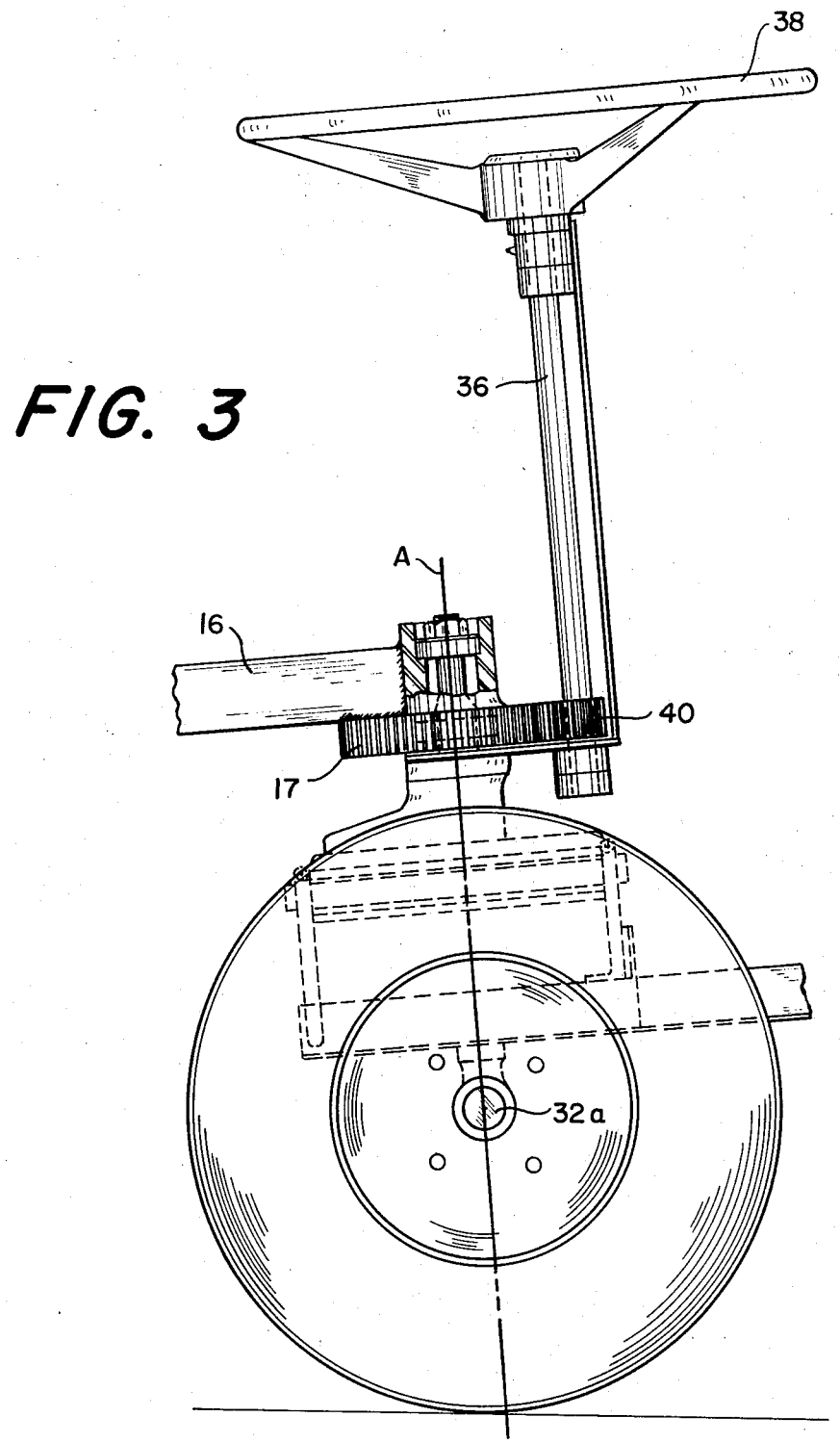

MAINTENANCE VEHICLE

BACKGROUND OF THE INVENTION

In golf green maintenance, the greens must be cut daily under many circumstances. In order to cut the greens daily and yet not damage them, various types of equipment have been provided. Hand cutting of the greens is laborious, time consuming, and expensive.

The present invention is directed to a vehicle that is primarily utilized for golf course green maintenance. The vehicle of the present invention can carry and drive three mower heads to cut the grass on the golf course green. The vehicle is equipped with balloon type tires and has an extremely short-turning radius so that it may cut the small area of golf course green.

The vehicle is provided with a power unit to raise and lower the rear chassis of the vehicle to thereby move the mower heads out of engagement with the ground.

Although designed primarily for use in mowing the golf course greens, the vehicle may also be utilized with other types of accessories of aerate, verti-cut, or spike the greens or to fertilize them.

SUMMARY

The present invention is directed to a short-turning radius vehicle having body parts which pivot relative to each other. A steering gear is provided to pivot the parts relative to each other and permit extremely short radius turns.

The vehicle is small and compact. It is preferably driven by an eight horsepower engine.

With the foregoing considerations in mind, it is an object of the present invention to provide an improved maintenance vehicle.

Another object of the present invention is to provide a short turning radius vehicle which has a power raisable chassis.

These and other objects of the present invention will become apparent as this description proceeds in conjunction with the accompanying drawings.

DESCRIPTION OF THE DRAWINGS

FIG. 2 is a top plan view of the vehicle of FIG. 1 with certain parts removed for clarity.

FIG. 3 is a partial sectional view to an enlarged scale of the steering mechanism shown in FIGS. 1 and 2.

DESCRIPTION OF THE PREFERRED EMBODIMENT

Figure 1:
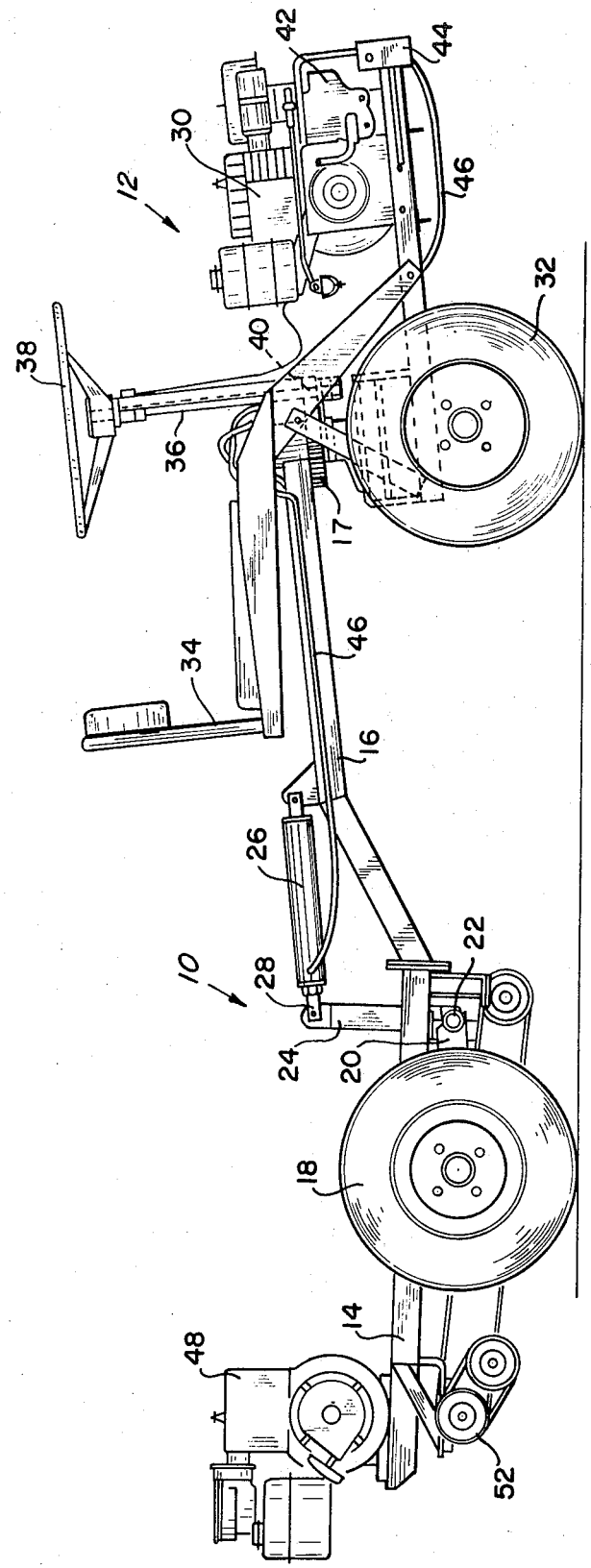
FIG. 1 is a side elevation of the vehicle of the present invention.

Referring to the drawings, there is shown a vehicle having a first body member 10 and a second body member 12. The first body member 10 has an accessory retaining frame 14 formed of structural steel. A forwardly extended chassis member 16 extends from the accessory retaining frame 14 and is fixed thereto.

Fixed to the forward end of chassis member 16 is a steering gear 17 as is best seen in FIG. 3. At the rear end of body member 10 wheels 18 are supported on the body. The wheels 18 are each rotatably attached to arms 20 which extend forwardly from the wheels 18 to a pivotting rod 22 to which they are non-rotatably connected. The pivotting rod 22 has a crank 24 fixed to its center portion and extends vertically therefrom as is best seen in FIG. 1. Together, the arms 20, the pivotting rod 22, and the crank 24, form a bell crank member which is utilized to raise and lower the accessory frame 14 relative to the wheels 18.

A hydraulic power cylinder 26 is fixed between the chassis member 16 and the crank 24 to rotate the bell crank member about pivotting rod 22 and thereby raise and lower the frame 14 relative to wheels 18. The power cylinder 26 has a piston 28 which extends therefrom to cause the rotational movement of the bell crank member.

The second body member 12 has mounted thereon a driving engine 30 which is preferably an 8 horsepower gasoline internal combustion engine. Also positioned on second body member 12 are driving wheels 32 on axle 32a. The engine 30 and driving wheels 32 are conventionally connected to each other through a belt drive (not shown) and trans-axle (not shown) so that the engine 30 drives wheels 32 in a conventional fashion.

Also fixed to the second body member 12 is a seat 34 and forward of seat 34 is positioned a steering column 36. The steering column 36 is journaled for rotation in a vertical position and has a steering wheel 38 fixed thereon. The lower end of the steering column 36 has a steering pinion 40 fixed thereto which meshes with steering gear 17 as is best seen in FIG. 3. With the steering column 36 journaled in the second body member 12 and the steering gear 17 fixed to the first body member 10, it will be seen that rotation of the steering wheel causes first body member 10 and second body member 12 to pivot relative to each other about axis A as shown in FIG. 3. It will further be noted that axis A extends through axle 32a of the driving wheels 32 to permit short radius turns.

The hydraulic pump 42 (FIG. 1) is driven by the driving engine 30 to supply hydraulic fluid under pressure. A hydraulic reservoir 44 and hydraulic lines 46 make up a hydraulic circuit to actuate power cylinder 26 to raise and lower the accessory retaining frame 14. The hydraulic circuit is controlled by a foot operated control (not shown).

The first body member 10 has an auxiliary engine 48 positioned thereon. The auxiliary engine 48 is fixed to an auxiliary engine mount 48a which extends to the rear of accessory frame 14. The auxiliary engine 48 is utilized to drive accessories carried by the vehicle. Mower frames 50 are partially shown in FIG. 2 to illustrate where grass mowers may be positioned on the vehicle for mowing golf course greens. The mower frames 50 carry grass mowers (not shown) which may be driven by auxiliary engine 48 through drive means 52 (FIG. 1).

In the operation of the vehicle, the steering wheel 38 may be rotated so that the front portion of the body or second body member 12 rotates through a range of at least 160° relative to the rear portion of the body or first body member 10. This rotation is possible because the chassis member 16 extends forward and above drive wheels 32 so that the drive wheels 32 may pass rearwardly and under the chassis member 16 upon severe pivotting of the two body parts relative to each other.

When the vehicle is utilized for cutting golf course greens, it is driven straight across the green with the mower engaging the green. When the edge of the green is reached, the power cylinder 26 is actuated to lift the accessory retaining frame 14 to raise the mowers 50 off the ground. The vehicle is then driven off the green, turned around, and as it again reaches the green, the mowers are lowered by use of the power cylinder 26.

Because of the extremely short radius turns which may be made with this invention, very little time is wasted in circling the green to obtain mower position on the green. Further, the vehicle has large balloon tires which do not injure the ground or grass on the green nor do they make the green uneven in any way.

Since the pivot axis A of the body members 10 and 12 is located immediately above axle 32a of the driving wheels 32, the wheel base of the vehicle is relatively short and the turning of the vehicle is eased due to the proximity of the pivot axis A and the axle 32a. The driving engine 30 supplies power through a conventional power train to the driving wheels 32. Even though the wheels 32 also steer the vehicle, they are fixed relative to the engine 30 so that the drive train is simplified.

According to the provisions of the Patent Statutes, I have explained the principle, preferred construction, and mode of operation of my invention and have illustrated and described what I now consider to represent its best embodiment. However, I desire to have it understood that within the scope of the appended claims, the invention may be practiced otherwise than as specifically illustrated and described.

What is claimed is:

1. A rideable, short-turning radius vehicle for golf course maintenance comprising:
   a. a first body member having
      1. an accessory retaining frame,
      2. a forwardly extending chassis member fixed to said frame and having a steering gear nonrotatably fixed to the forward end thereof,
      3. a pair of non-driven wheels each rotatably mounted on a bell crank member pivotally secured to said frame whereby rotation of said bell crank member in opposite directions raises and lowers said frame relative to the ground, and
      4. power means secured between said bell crank member and said frame to selectively actuate said bell crank member,
   b. a second body member pivotally connected to the forward end of said chassis member and having
      1. an engine mounted thereon,
      2. driving wheels mounted thereon and drivingly connectable to said engine for operation of said vehicle,
      3. a seat mounted thereon and fixed to move with said second body member,
      4. a steering column rotatably received within said second body member and having a steering pinion fixed thereto and meshing with said first member steering gear, and
      5. means fixed to said steering column to turn it and thereby steer said vehicle said chassis member and said driving wheels so positioned that said driving wheels pass under said chassis member upon guiding said vehicle through severe short radius turns.

2. The vehicle of claim 1 wherein said driving wheel axle is intersected by the axis of the pivot point between said first and second body members.

3. The vehicle of claim 1 wherein said second body member may pivot at least 160° relative to said first body member when said steering mechanism is turned through its full range of motion.

4. The vehicle of claim 1 wherein said power means between said bell crank member and said frame is a hydraulic cylinder and piston actuated by hydraulic fluid under pressure.

5. The vehicle of claim 1 wherein said first body member has an independent auxiliary engine mounted thereon to power accessories retained on said frame.

6. The vehicle of claim 1 wherein said engine is mounted forward of said driving wheels and turns with said second body member when said vehicle is turned.

7. The vehicle of claim 1 wherein said steering gear and said steering pinion mesh at a position forward of the pivot connection between said first and second body members.

8. The vehicle of claim 4 wherein said engine operates a hydraulic pump to pressurize fluid to actuate said hydraulic piston and cylinder as well as driving said vehicle.

* * * * *